US009432703B2

(12) United States Patent
He et al.

(10) Patent No.: US 9,432,703 B2
(45) Date of Patent: Aug. 30, 2016

(54) METHOD AND SYSTEM FOR INSERTING CONTENTS INTO VIDEO PRESENTATIONS

(71) Applicant: TCL RESEARCH AMERICA INC., San Jose, CA (US)

(72) Inventors: Jia He, San Jose, CA (US); Chen Huang, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 39 days.

(21) Appl. No.: 14/542,787

(22) Filed: Nov. 17, 2014

(65) Prior Publication Data
US 2016/0142747 A1    May 19, 2016

(51) Int. Cl.
| H04N 21/234 | (2011.01) |
| H04N 21/2668 | (2011.01) |
| H04N 21/81 | (2011.01) |
| H04N 5/272 | (2006.01) |

(52) U.S. Cl.
CPC ........ *H04N 21/23424* (2013.01); *H04N 5/272* (2013.01); *H04N 5/2723* (2013.01); *H04N 21/23418* (2013.01); *H04N 21/2668* (2013.01); *H04N 21/812* (2013.01)

(58) Field of Classification Search
CPC ............... H04N 5/272; H04N 5/2723; H04N 21/23424
See application file for complete search history.

(56) References Cited

U.S. PATENT DOCUMENTS

| 2008/0231751 | A1* | 9/2008 | Zalewski | ............... | H04N 5/147 348/578 |
| 2011/0075992 | A1* | 3/2011 | Mei | ........................ | G06Q 30/02 386/249 |
| 2011/0188836 | A1* | 8/2011 | Popkiewicz | ........... | G06Q 30/02 386/278 |
| 2013/0259448 | A1* | 10/2013 | Stankiewicz | ........ | G06K 9/4628 386/278 |
| 2014/0156364 | A1* | 6/2014 | Zalewski | ............... | H04N 5/147 705/14.4 |
| 2014/0165093 | A1* | 6/2014 | Redol | .................. | H04N 21/812 725/32 |

FOREIGN PATENT DOCUMENTS

| CN | 101489139 A | 7/2009 |
| CN | 101621636 A | 1/2010 |
| CN | 102572079 A | 7/2012 |

* cited by examiner

*Primary Examiner* — Robert Hance
(74) *Attorney, Agent, or Firm* — Anova Law Group, PLLC

(57) ABSTRACT

The present invention provides a salience-based media manipulation method and system for inserting contents into video presentations. The method includes establishing an advertisement-element pool containing a plurality of advertisement elements provided for insertion; obtaining an input video presenting at least one scenes and containing a plurality of original frames; and performing shot grouping and primary scene analysis on the input video to acquire scenes with static background and limited camera motion. The method also includes detecting white-space candidates in the acquired scenes for inserting at least one advertisement element and adjusting alignment between the white-space candidates and the at least one advertisement element. The adjusted alignment increases a salience gain of the advertisement elements and limit salience change of the scenes without insertion. The method further includes generating an output video by inserting the advertisement elements into the white-space candidates according to the adjusted alignment between the white-space candidates and the advertisement elements.

16 Claims, 7 Drawing Sheets

METHOD AND SYSTEM FOR INSERTING CONTENTS INTO VIDEO PRESENTATIONS

FIELD OF THE DISCLOSURE

The present disclosure relates to the field of video processing technologies and, more particularly, relates to content insertion into image/video sequences.

BACKGROUND

Currently, the most common ways to insert contents, e.g., advertisements, into a video are to display the advertisement stream at the beginning and during the playing back of the video. For example, on YouTube, there always are several advertisement slots in the video stream.

As shown in FIG. 1(a), the viewers have to see the display of advertising video before the play of the selected video, the duration of the advertisement is marked in red circle in FIG. 1(a). This is one of the basic ways to insert the advertisements into video sequences. However, the efficiency of this advertisement broadcasting is not well evaluated. Viewer of the video may change the video channel when there is advertisement showing, and may come back until the display of advertisement is finished. This enforced way of advertisement insertion can be quite annoying and causes unpleasant viewer experience.

Another common way of displaying advertisement during video show is displaying the advertisement contents as transparent show boxes on the top layer of the video stream, as showed with red circle in FIG. 1(b), which is also annoying and may affect the users' appreciation to the selected video.

Thus, according to the disclosure, one of the challenges for image/video manipulation is how to obtain the desired results and at the same time to keep the original main contents of the original source. Salience may be used as one of the basic methodologies to measure the ability of pixels, regions and objects to attract human's visual attention when they look at the image/video. However, salience information is often not incorporated when inserting contents into video sequences. Moreover, existing technologies may simply overlay advertisement on the top layer of the screen, such that the overlay contents cannot blend into the scene which is uncomfortable to watch.

The disclosed method and system are directed to solve one or more problems set forth above and other problems.

BRIEF SUMMARY OF THE DISCLOSURE

One aspect of the present disclosure provides a salience-based media manipulation method for inserting contents into video presentations. The method includes establishing an advertisement-element pool containing a plurality of advertisement elements provided for insertion; obtaining an input video presenting at least one scenes and containing a plurality of original frames; and performing shot grouping and primary scene analysis on the input video to acquire scenes with static background and limited camera motion. The method also includes detecting white-space candidates in the acquired scenes for inserting at least one advertisement element and adjusting alignment between the white-space candidates and the at least one advertisement element. The adjusted alignment increases a salience gain of the advertisement elements and limit salience change of the scenes without insertion. The method further includes generating an output video by inserting the advertisement elements into the white-space candidates according to the adjusted alignment between the white-space candidates and the advertisement elements.

Another aspect of the present disclosure provides a salience-based media manipulation system for inserting contents into video presentations. The system includes an advertisement processing module, a video pre-processing module, a white-space candidate detection module, an alignment adjustment module and an output module. The advertisement processing module is configured to obtain an advertisement elements pool containing a plurality of advertisement elements provided for insertion. The video pre-processing module is configured to perform shot grouping and primary scene analysis of an input video to acquire scenes with static background and scenes with limited camera motion. The input video presents at least one scene and containing a plurality of original frames. The white-space candidate detection module is configured to detect white-space candidates in the acquired scenes for inserting at least one advertisement element. The alignment adjustment module is configured to adjust alignment between the white-space candidates and the advertisement elements to increase a salience gain of the advertisement elements and to limit salience change of the scenes without insertion. The output module is configured to generate an output video by inserting the advertisement elements into the white-space candidates according to the adjusted alignment between the white-space candidates and the advertisement elements.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

To improve the effectiveness of advertising in the videos on demand and the broadcasting videos, there are two aspects to be considered: the customized advertising contents and a customer accepted advertisements insertion mode. The present disclosure provides a salience-based media manipulation method to insert advertisement elements into the 3D scene of the image/video sequences.

The term salience, as used herein, may refer to the ability of pixels, regions and objects to attract human's visual attention. In other words, salience refers to the state or quality by which an item stands out relative to the item's neighbors in human visual system. The item may be an object, a region, a cluster of pixels, etc.

Figure 1A:
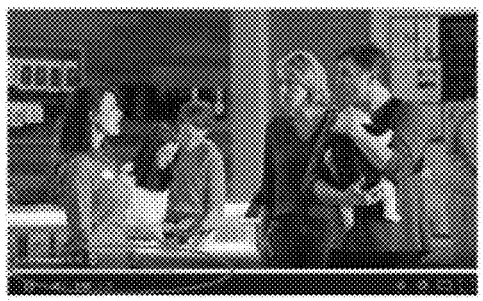
FIG. 1(a)-FIG. 1(b) illustrate two current advertisement display approaches.
Figure 1B:
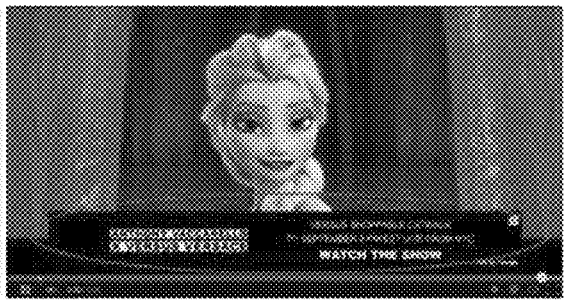
Figure 2A:
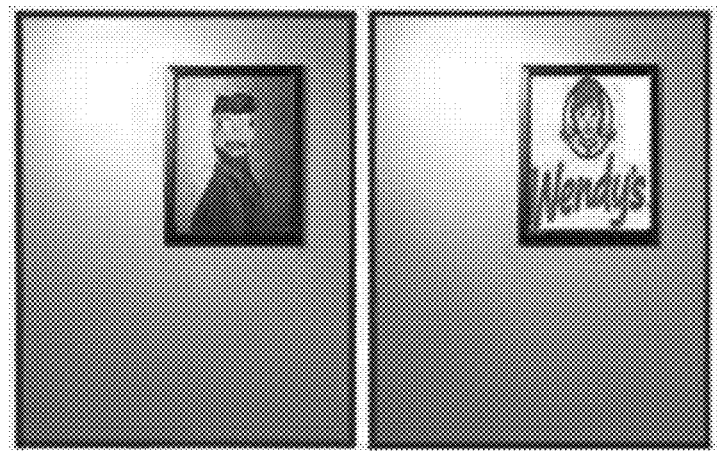
FIG. 2(a)-FIG. 2(b) illustrate two advertisement insertion consistent with the present disclosure.
Figure 2B:
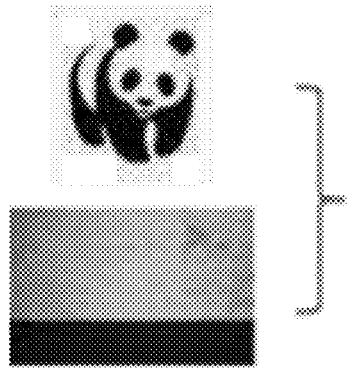
Figure 2B:

FIG. 2 shows two examples of advertisement insertion results obtained with the present disclosure. As shown in FIG. 2(a), an advertisement logo may overlay an original region in a media representation. As shown in FIG. 2(b), an advertisement logo may be blended into an original region in a media representation. In both illustrations FIG. 2(a) and FIG. 2(b), the inserted advertisement elements may gain maximal salience while the rest of the original image/video maintains their original salience as much as possible. In certain embodiments, the inserted contents may not be advertisements, but any contents with graphical presentation that can be incorporated into image/video sequences.

Figure 3:
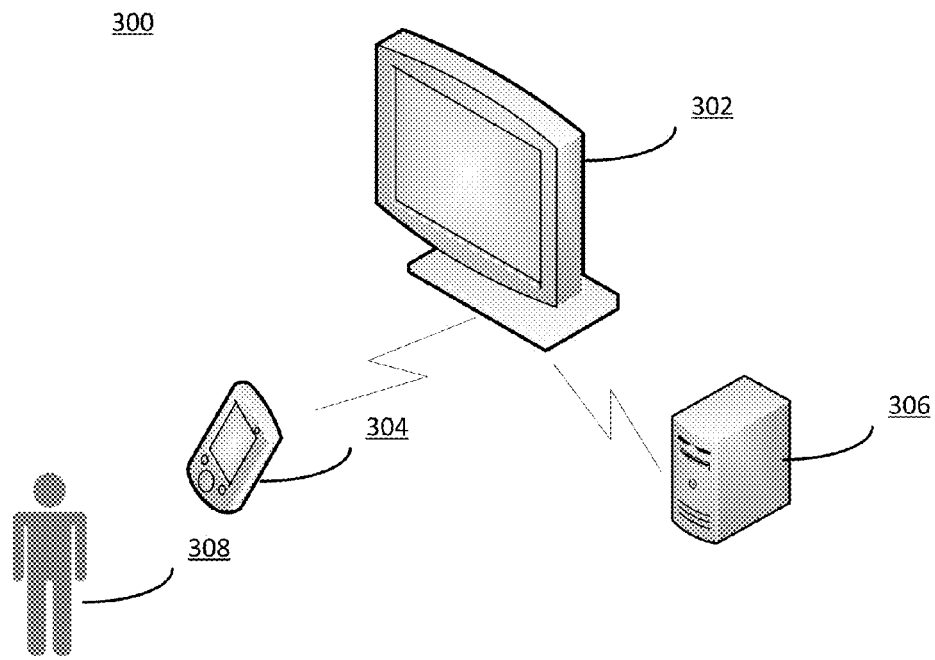
FIG. 3 illustrates an exemplary environment incorporating certain embodiments of the present disclosure.

FIG. 3 is an exemplary environment incorporating certain embodiments of the present disclosure. As shown in FIG. 3, environment 300 may include a display unit 302, a control unit 304, a server 306 and a user 308. Other devices may also be included.

The display unit 302 may be any kind of devices that are capable of playing image/video sequences, such as TV, computer, smart phone, tablet, digital camera, etc. The control unit 304 may be any kind of peripheral devices that can send instructions to the display unit 302, such as remote control, keyboard, mouse, control buttons, touch screens, etc. The display unit 302 and the control unit 304 may be integrated in one device.

The user 308 may interact with the display unit 302 using control unit 304 to watch various videos, control customer settings and perform other activities of interest, or the user 308 may simply use hand or body gestures to control the display unit 302 if motion sensor or depth-camera is used by the display unit 302. The user 308 may be a single user or a plurality of users, such as family members watching videos together.

Figure 4:
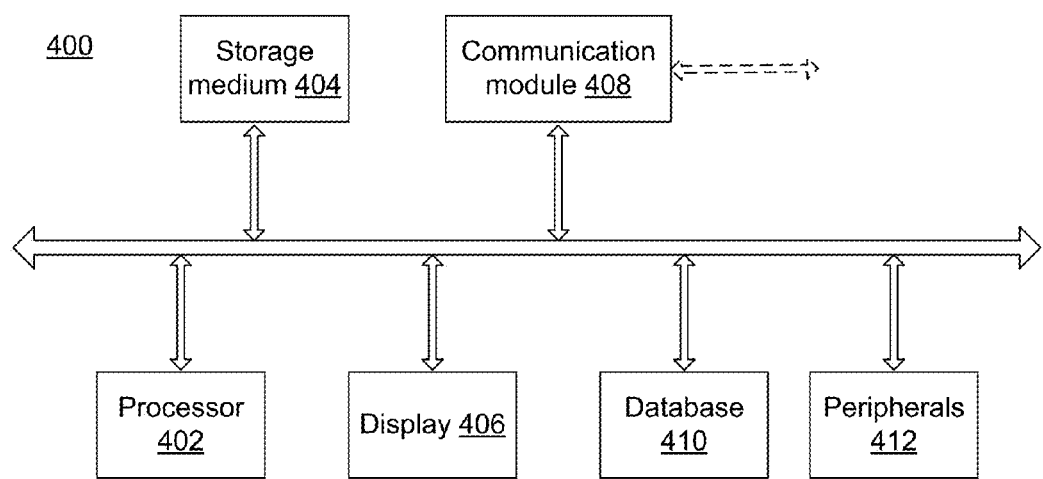
FIG. 4 illustrates an exemplary computing system consistent with the disclosed embodiments.

The display unit 302, the control unit 304, and/or server 306 may be implemented on any appropriate computing circuitry platform. FIG. 4 shows a block diagram of an exemplary computing system 400 capable of implementing the salience-based media manipulation system.

As shown in FIG. 4, computing system 400 may include a processor 402, a storage medium 404, a display 406, a communication module 408, a database 410, and peripherals 412. Certain devices may be omitted and other devices may be included.

Processor 402 may include any appropriate processor or processors. Further, processor 402 can include multiple cores for multi-thread or parallel processing. Storage medium 404 may include memory modules, such as ROM, RAM, flash memory modules, and mass storages, such as CD-ROM and hard disk, etc. Storage medium 404 may store computer programs for implementing various processes when the computer programs are executed by processor 402.

Further, peripherals 412 may include various sensors and other I/O devices, such as keyboard and mouse, and communication module 408 may include certain network interface devices for establishing connections through communication networks. Database 410 may include one or more databases for storing certain data and for performing certain operations on the stored data, such as database searching.

Specifically, storage medium 404 and database 410 may store an advertisement pool and an input video. The advertisement pool and the input video may be provided in advance and stored in a local storage medium or from an online network. The computing system 400 may implement a salience-based media manipulation method, and generate an output video by inserting elements from the advertisement pool into the input video. In the generated output video, the inserted advertisement elements can gain maximal salience while the rest of the original image/video maintains their original salience as much as possible.

Figure 5:
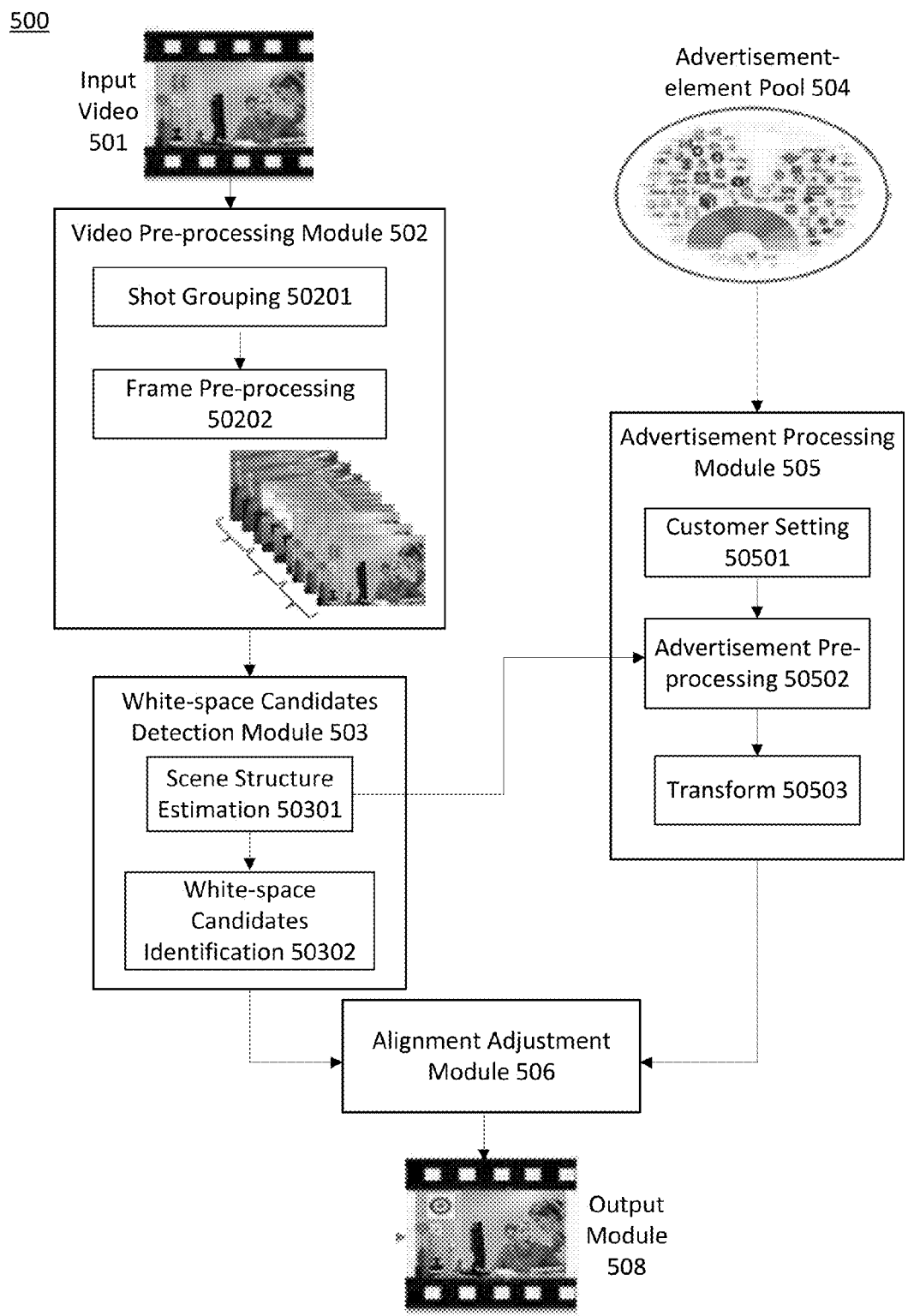
FIG. 5 illustrates a structure schematic diagram of an exemplary salience-based image/video manipulation system consistent with the disclosed embodiments.

FIG. 5 illustrates a structure schematic diagram of an exemplary salience-based image/video manipulation system consistent with the disclosed embodiments. As shown in FIG. 5, the salience-based media manipulation system 500 (e.g., computing system 400) may include a video pre-processing module 502, a white-space candidates detection module 503, an advertisement processing module 505, an alignment adjustment module 506, and an output module 507. Certain components may be omitted and other components may be added. The system 500 (e.g., the various components) may be implemented in hardware, software, or a combination of hardware and software.

In operation, the system 500 may receive an input video 501. The input video 501 may then be processed by the video pre-processing module 502. The processed video sequences may be provided to the white-space candidates detection module 503 for detecting white-space candidates. Further, based on an advertisement elements pool 504, the advertisement processing module 505 may process the advertisement elements for inserting to the white-space candidates. The alignment adjustment module 506 may select placement settings of the advertisement elements and adjust the alignment between the advertisement elements and the white-space candidates for inserting the advertisement elements into the video sequence.

The input video 501 may include any appropriate type of source for video contents and may contain various video sources. The contents from the input video 501 may include both video data and metadata. Plurality of frames may be associated with the video content and may be provided to other modules for processing. A single picture may also be included. The input video is divided into different sets of frames.

Figure 11:
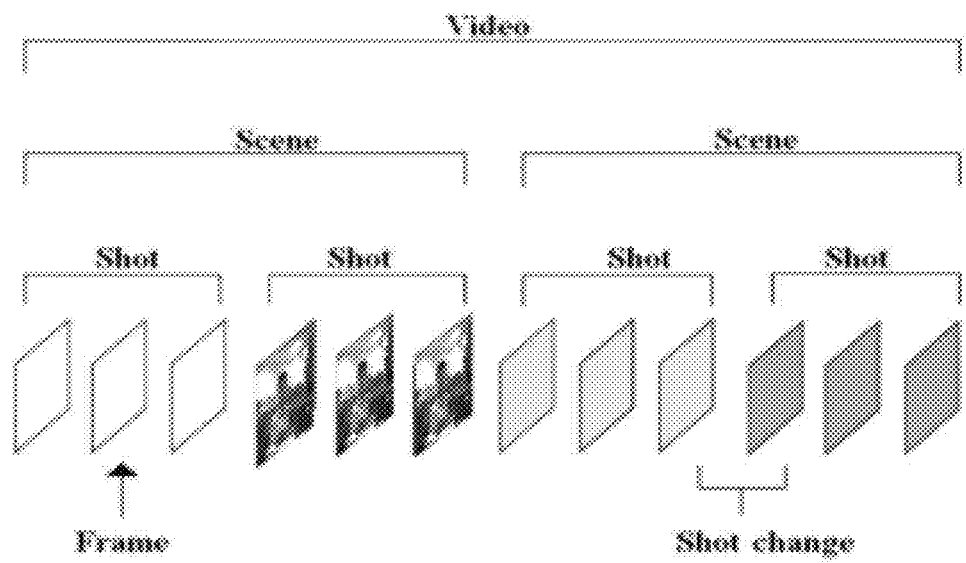
FIG. 11 shows a video stream being divided into different video components consistent with the disclosed embodiments.

Specifically, FIG. 11 shows a video stream being divided into different video components. As show in FIG. 11, a video stream may be divided into scenes, a scene may be divided into shots, and a shot may be divided into frames. In certain embodiments, a scene may present similar contents with one or more camera takes. A shot may be associated with one camera take. One shot is a group of frames with same scene background. A frame can be further divided into objects for further processing. In certain embodiments, a scene may contain only one shot.

Returning to FIG. 5, the video pre-processing module 502 may be configured to perform shot grouping and primary scene analysis to acquire scenes with static background and scenes with limited camera motion. The video pre-processing module 502 may further include a shot grouping submodule 50201 and a frame pre-processing submodule 50202. Other components or devices may also be included. Further, the shot grouping submodule 50201 may be configured to group the frames with similar shot. Such a group of frames may be assigned with a same advertisement element.

The frame pre-processing submodule 50202 may be configured to filter out the moving objects in scene and the static regions with occlusion during its shot, resulting only the static regions on walls without occlusion can be selected as placement candidates.

The white-space candidates detection module 503 may be configured to detect appropriate white-space candidates for advertisement elements insertion. Specifically, the white-space candidates may be selected from existing surfaces in a 3D scene of the video.

Figure 7:
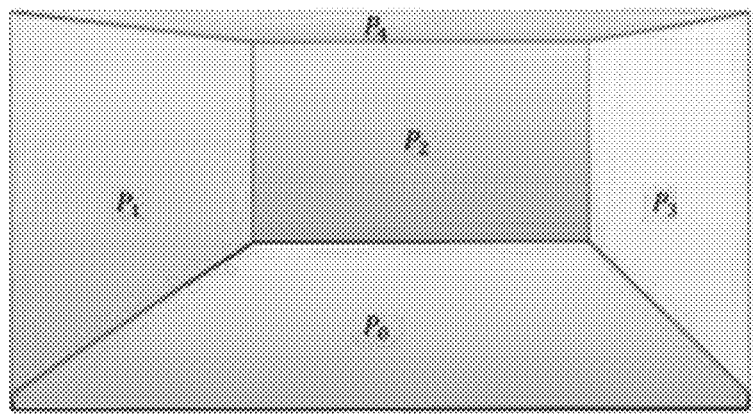
FIG. 7 illustrates exemplary frame with five estimated plane surfaces obtained consistent with the present disclosure.

The white-space candidates detection module 503 may further include a scene structure estimation submodule 50301 and a white-space candidates identification submodule 50302. The scene structure estimation submodule 50301 may be configured to estimate the scene geometry as several planes. In a 3D scene of a video, the 3D geometry of the scene may be divided into several surfaces. In certain embodiments, the term plane surface, surface and plane may be used interchangeably. FIG. 7 shows an example of a frame with five planes.

The white-space candidates identification submodule 50302 may be configured to identify a desired plane or planes for advertisement elements insertion among the estimated planes acquired from the scene structure estimation submodule 50301. Specifically, a white-space candidate may be a space in one existing plane of a 3D scene. Further, the white-space candidates identification submodule 50302 may be configured to determine the location of the white-space candidate in the existing plane. The white-space candidates identification submodule 50302 may also determine a scaling parameter of an advertisement element for inserting to the white-space candidate. The white-space candidate may later be used as a space for advertisement elements insertion by replacing the pixels of the white-space candidate with the scaled advertisement element in each frame of the 3D scene. The appropriate white-space candidates may have smooth surface, homogeneous textures and suitable size, so that the advertisement elements can easily replace the pixels of the white-space candidates without bring in any artifact.

The advertisement elements pool 504 may include one or multiple advertisement elements for inserting into the input video 501. In certain embodiments, the inserted contents may not be advertisements, but any contents with graphical presentation that can be incorporated into image/video sequences. There can be one or multiple advertisement elements provided as advertisement source pool.

The advertisement processing module 505 may be configured to process advertisement elements based on salience features. The advertisement processing module 505 may further include a customer setting submodule 50501, an advertisement pre-processing submodule 50502 and a transform submodule 50503.

The customer setting submodule 50501 may be configured to determine contents and amount of advertisement elements in advance according to the advertisement provider's requirements or users' preferences, so an advertisement pool may be established with the selected advertisement elements.

The advertisement pre-processing submodule 50502 may be configured to preprocess an advertisement element before insertion based on salience features to get similar visual quality as an original shot. Specifically, the advertisement pre-processing submodule 50502 may be configured to generate a 2D advertisement image with similar quality with the surroundings of a white-space candidate in the original shot.

The transform submodule 50503 may be configured to place the advertisement element into a 3D scene and render the 3D scene to 2D images as frames of the video. Specifically, an advertisement element may be treated as "picture on wall", meaning the advertisement element may replace the pixels of a white-space candidate at a specific location with specific scale in each frame of the 3D scene.

The alignment adjustment module 506 may be configured to adjust to a desired alignment between the white-space candidates and the advertisement elements based on salience features. The alignment adjustment may include selecting an advertisement element from the advertisement elements pool to be inserted into a white-space candidate, and placing the advertisement element into the scene of the white-space candidate. The salience features may include visual attention gain of an advertisement element and the salience change distortion of a whole frame. The visual attention gain of an advertisement element may refer to a gained salience of the inserted advertisement element. The salience change distortion may refer to the salience distribution change of the manipulated frame generated by inserting the advertisement element into the original frame.

Further, the output module 508 may be configured to generate an output video by placing advertisement elements in the input video according to the adjustment results from the alignment adjustment module 507. The number of inserted advertisement elements may be one or plural as there may be one or more scenes with static background and scenes with limited camera motion. Certain modules may be merged or omitted and other modules may be included.

Figure 6:
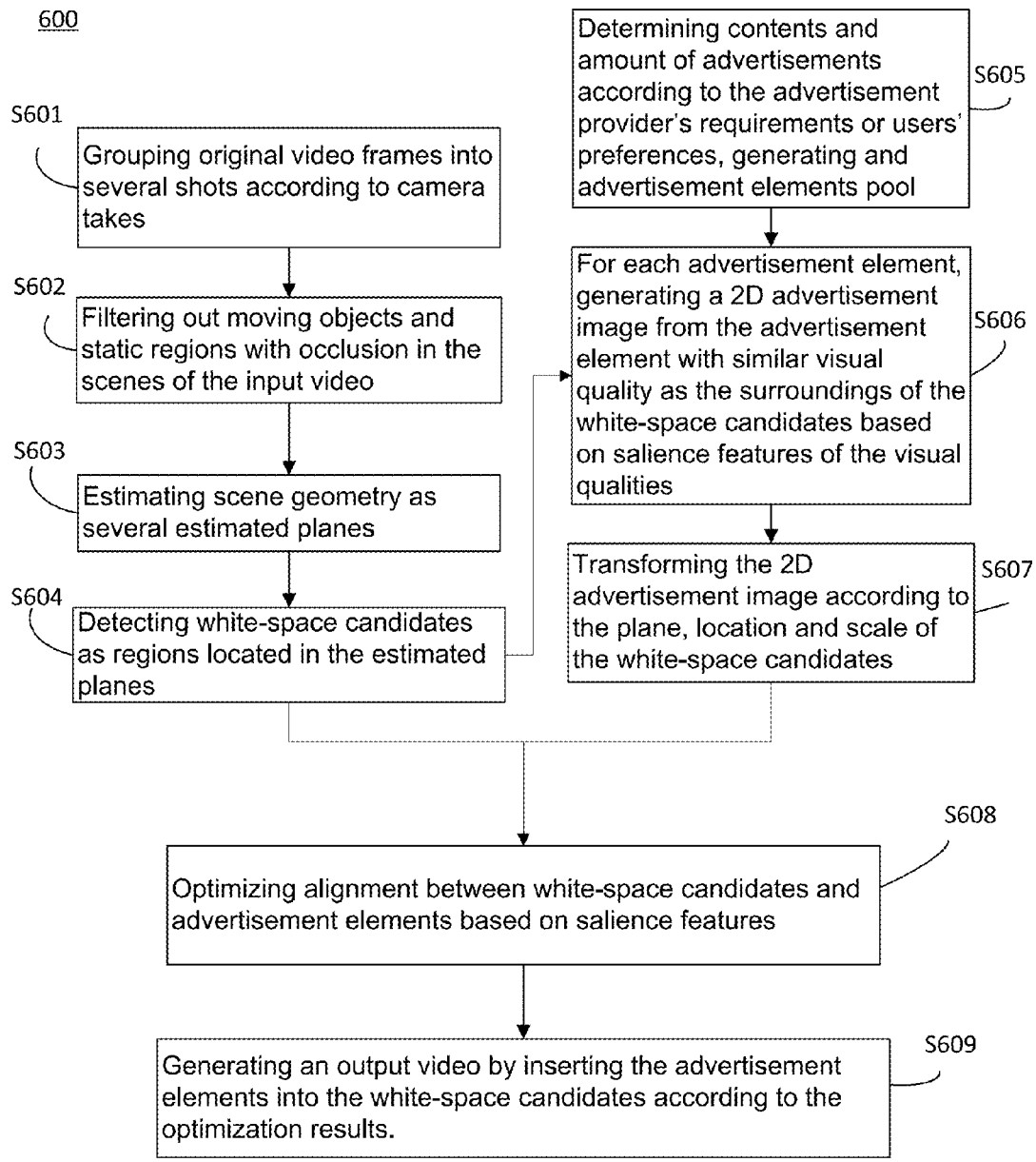
FIG. 6 illustrates a flow chart of an exemplary salience-based media manipulation process for inserting contents into image/video sequences consistent with the present disclosure.

FIG. 6 illustrates a flow chart of an exemplary salience-based media manipulation process 600 for inserting contents into image/video sequences.

As shown in FIG. 6, at the beginning, an input video is processed by grouping original video sequences into several shots according to camera takes (S601). The frames with similar shot may be assigned with same advertisement. It helps to keep the consistency of advertisement placement of the similar scenes during the whole video. The process may group the original video sequences into several shots, for example, according to the camera takes, where the camera of the scenes has limited motion and location change. Herein, a camera take may refer to a continuous recorded contents with a given camera setup. Thus, for a shot from a camera take with similar scene background, a same advertisement may be inserted into the frames of this scene.

For example, given a video with K grouped shots $\{S_k\}_{k=1}^{K}$, $S_k$ denotes the k th shot, and each shot $S_k$ have $N_k$ frames, denoted as $\{f_{k,n}\}_{n=1}^{N_k}$. The frames in shot $S_k$ are the frames token at a same location and with similar scene background, and can be aligned with a same advertisement element. Thus, the problem of automatic advertisement placement into video can be solved by optimizing the matching and insertion of M advertisement elements $\{A_m\}_{m=1}^{M}$, with K shots $\{S_k\}_{k=1}^{K}$.

Given the grouped frames, in each shot, the moving objects in scene and the static regions with occlusion during its shot are filtered out (S602), resulting only the static regions without occlusion can be selected as placement candidates. In certain embodiments, this step can be done by employing an moving object segmentation algorithm using a background registration technique. By filtering the moving objects and occlusion regions, it also provides a clearer source for the scene structure geometry estimation in next procedure.

The scene geometry may be estimated as several planes (S603). An placed advertisement element on a white-space candidate may follow a 3D scene structure logic. The 3D scene structure logic may treat the advertisement element as "picture on wall" in each frame of a shot, and place the advertisement element on one of the 3D surfaces in the original frames of the shot. Specifically, if the advertisement is placed at arbitrary position with arbitrary orientation, the viewers may get confused by the structure logic of the resulted scene. Based on this observation, the orientation of the inserted advertisement pictures should be the same with the surface of its located white-space candidate thus it has valid 3D structure, and also no additional 3D structure is produced during the advertisement placement procedure.

Therefore, the 3D scene structure logic may be satisfied when the advertisements are placed on one of the existing surfaces in scene. The existing surfaces in scene can be estimated in this step (S603).

Specifically, for frame $f_{k,n}$ in shot $S_k$, the estimated structure geometry of several surface components can be denoted by transform functions $\{T_l\}_{l=1}^{L}$, where L is the total number of surfaces in the frame $f_{k,n}$. FIG. 7 shows an example of a frame with five plane surfaces $\{\Pi\}_{i=0}^{4}$, each plane $\Pi_1$ has its transform function $T_l$.

Returning to FIG. 6, not all the regions on the surfaces estimated in last step (S603) can be used as white-space candidates for advertisement placement. The procedure may detect the desired white-space candidates (S604) with smooth surface, homogeneous textures and suitable size, so that the advertisement elements can easily replace the pixels of the white-space candidates without bring in any artifact.

Specifically, the white-space candidates on surface $T_l$ can be represented with its location $P_p(P_p \in \Re^3)$ and its scale $P_s(P_s \in \Re)$.

There can be one or multiple advertisements provided as advertisement source pool. The contents and amount of advertisements may be determined in advance according to the advertisement provider's requirements or users' preferences (S605). The selected advertisement elements can form an advertisement pool.

Without loss of generality, the required advertisements can be denoted by $\{A_m\}_{m=1}^{M}$, where M is the total number of advertisements to be inserted, and the maximal appearances of advertisement $A_m$ as $F_m$, which can be set by users.

For each advertisement element, a 2D advertisement image may be generated with similar quality as the surroundings of the white-space candidates based on salience features (S606).

Salience is used as one of the basic methodologies to measure the ability of pixels, regions and objects to attract human's visual attention when they look at the image/video. The salience estimation approaches employed in the present embodiments are described in the following paragraphs.

The salience estimation considers three kinds of salience stimuli: top-down semantic stimuli, bottom-up stimuli and salience comes from center-bias. Salience map as a common representation of the distribution of salience, where higher value denotes the higher probability that human may look and have eye fixations. Salient objects are the ones standout from the surrounding background and have higher human visual attention probability than their surroundings.

In both task-driven object searching and free-view modes, top down stimuli applies to situations where people tend to fixate consistently on people, faces, animals, texts, and so on. Those objects serve as searching targets or the semantic objects help human to understand the image/video, thus attracts high attention of observers.

The advertisement elements generally contain texts and logos, which can serve as top-down visual stimuli at some levels no matter where they are placed in the scene.

According to the existing biologically inspired and computational salience models, image features of the bottom up stimuli such as intensity, colors, contrast, orientation, motion and so on, and that kinds of image features make the region standout from others.

In the case of placing advertisements into image/video with multiple advertisement choices, different advertisement may change the features of manipulated image/video accordingly with different distribution of intensity, colors, contrast, orientations, and so on.

Objects located at the center of the image tend to have high visual attention. The center-bias is intrinsic visual salience, because human tends to look at the image/video center to obtain more views and information. On the other hand, in natural images/videos, the distribution of subjects of interests and salience is usually biased toward the center, which is mainly caused and known as photographer bias. Human's view strategy also indicates that viewers may reorient at a greater frequency to the center of a scene relative to other locations, when they expect highly salient or interesting objects to be placed there. Besides, viewers tend to pay more attention to the salient objects which close to the location of dominate objects, thus to make short saccades rather than long saccades.

In the present embodiments, when there are multiple white-space candidate locations which are valid to place an advertisement, selecting the locations with high center-bias may increase the salience of the advertisement.

In the general structure of salience models, the salience stimuli are detected and extracted from the image features. The final salience map is estimated as a combination of different features maps. The way the different maps are fused is an important aspect of attention system, because the weighting function of fusion determines the importance of the features. The eye tracking data may be employed in generating salience maps.

When placing advertisement into image/video, the advertisements are designed to represent product brands, service providers, customer benefits, etc. Generally, these elements always are cognizable for most of the viewers, because the advertisements have semantic meanings to the viewers. These inserted advertisements can be viewed by the viewers and can also be appreciated along with the original image/video. To be general, the present disclosure requires that all the advertisement elements are cognizable and thus serve as semantic stimuli in human visual salience system. Certain embodiments may apply the model learned with eye tracking data to evaluate the salience distribution of the manipulated image/video. Since the advertisement element known as a semantic top-down stumili prior, the present disclosure mainly estimates the salience differences based on bottom-up stimuli and center-bias.

Returning to FIG. 6, when generating a 2D advertisement image with similar quality as the surroundings of the white-space candidates based on salience features (S606), a filter h(•) may be applied on the 2D advertisement image to pursue that the filtered element has similar quality with the replaced pixels. The similar quality may include blurriness, lighting effect and other camera distortions which simulate the capturing environment and apply them onto the new element.

This step is based on a salience feature about image/video quality. In image/video capturing, the camera distortions are common. The out-focus, which is one of camera distortions, can also produce blurriness problem in the image/video as well. To place advertisements, the advertisement elements may be overlaid on the original image/video as "pictures on wall", and the original pixels at the corresponding locations are replaced. The original advertisement sources are provided without such camera distortions. If directly replacing the pixels of the "white space" (white-space candidates) with the advertisement, there may be visual quality jump between the advertisement element with its surroundings, which make obvious artifacts for viewers. To get similar visual quality with the original pixels, the advertisement element can be manipulated with some filters before being placed. The manipulated pixels may have similar distortion and lighting with the original pixels. In certain embodiments, noising, blurring and lighting can be the main quality aspects to obtain similar visual quality.

In certain embodiments, h(•) may be simplified as a Gaussian kernel with variance $\delta_{mk}$, which is applied to blur the 2D advertisement image to a similar blurriness degree with the pixels at its insertion position. The Gaussian kernel with $\delta_{mk}$ is determined by the salience feature about image/video quality, which satisfies:

$$|IQA(f'_{k,n}) - IQA(\text{Gaussian}(A_m, \delta_{mk}))| \le Th_0 \quad (1)$$

In certain embodiments, blurred image quality metric (IQA) may measure the blurriness of images. $f'_{k,n}$ is the corresponding overlaid region in the original frame $f_{k,n}$. $Th_0$ is the quality threshold.

To place an advertisement element into a 3D scene, the advertisement image is treated as "picture on wall" and then this 3D object can be rendered to 2D images as frames of the video. The advertisement image may be transformed according to the surface plane, location and scale of the white-space candidates (S607).

Specifically, the transform function of rendering $A_m$ from the lth surface in scene of $f_{k,n}$ at the location $P_p$ with scale $P_s$ can be represented as $T_l(A_m, P_p, P_s)$. Thus the transformed advertisement elements are also effected by their 3D position $P_p$ and the scale parameter $P_s$. To avoid possible flickering artifacts, the 3D position $P_p$ and scale $P_s$ of $A_m$ in all the frames of shot $S_k$ should maintain the same.

In certain embodiments, the 3D inserted advertisement objects have limited depth variance and location range. Based on this observation, all the pixels in $\hat{f}_{k,n}$ for the inserted advertisement have approximately a same distortion h(•). Thus the distorted $A_m$, $\hat{A}_m$ can be approximated as:

$$\hat{A}_m = T_l(h(A_m), P_p, P_s) \approx h(T_l(A_m, P_p, P_s)) \quad (2)$$

The alignment between the white-space candidates and the advertisement elements may be optimized based on salience features (S608).

Specifically, the advertisement elements A are placed into shot $S_k$ with frames $\{f_{k,n}\}_{n=1}^{N_k}$. The insertion generates new frames, which are denoted as $\{\hat{f}_{k,n}\}_{n=1}^{N_l}$. In certain embodiment, the new frames are generated by placing $A_m$ into frame $f_{km}$ with Gaussian filter Gaussian(•) at the position $P_p$ on surface l with scale of $P_s$. Thus:

$$\hat{f}_{k,n} = (\hat{A}_m \oplus f_{k,n}) \quad (3)$$
$$= (T_l(\text{Gaussian}(A_m, \delta_{mk}), P_p, P_s) \oplus f_{k,n})$$

where $\oplus$ is the overlay operation which puts the processed advertisement element $\hat{A}_m$ at some position $P_p$ of $f_{k,n}$.

Figure 8:
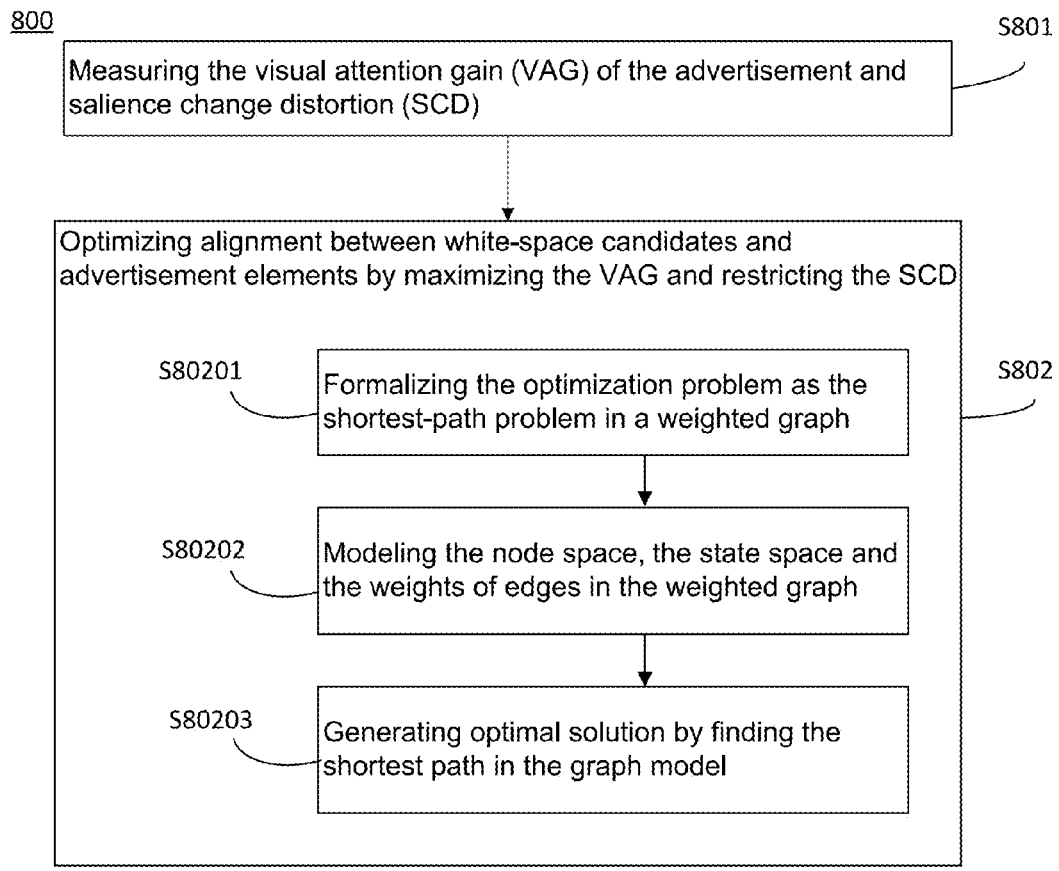
FIG. 8 illustrates a flow chart of an exemplary alignment adjustment process based on salience features consistent with the present disclosure.

In certain embodiments, when inserting an advertisement element into a white-space candidate, salience features including the visual attention gain (VAG) of the advertisement and salience change distortion (SCD) of the whole frame are measured (S801). FIG. 8 is a flow chart of an exemplary alignment adjustment process based on salience features.

Due to the manipulation, the image/video is changed based on components, so as the salience distribution of the whole frame. Beside the additional salience top-down stimuli from the advertisement elements, the bottom-up stimuli are also changed. A desired advertisement insertion should let the inserted advertisement gain as much salience as possible but also not change too much visual attention distribution of the original frame. Thus two salience change metrics are employed in the embodiments to measure the salience distribution change from these two aspects: Visual Attention Gain (VAG) of advertisement and Salience Change Distortion (SCD) of the whole frame.

Specifically, during the insertion procedure, different alignment of $A_m$ and shot $S_k$, different insertion settings of position $P_p$, orientation determined by transform function $T_l(•)$, scale $P_s$, etc, are highly related to the bottom-up salience stimuli and center-bias. The salience of the advertisement, which differs from the original salience and ignores the top-down stimuli, is denoted as Visual Attention Gain of the advertisement. For the best visual effect, the visual attention gain of the inserted advertisements may be maximized. On the other hand, the insertions of advertisements cause Salience Change for those frames. We measure the performance of advertisements placement based on these two specified aspects: the visual attention gain of ads and the salience change distortion.

In certain embodiments, the Visual Attention Gain (VAG) of advertisement element $\hat{A}_m$ in frame $\hat{f}_{k,n}$ of shot $S_k$ may be measured by function $\psi_{m,k}(\hat{A}_m|A_m, f_{k,n})$. Function G(•) may be used as the estimation of salience distribution of an image.

Certain embodiments can apply a highly evaluated computational salience model, Graph-Based Visual Saliency (GBVS), which defines Markov chains over image feature maps, and treated the equilibrium distribution over map locations as saliency values. The VAG on frame $f_{k,n}$ with Advertisement $\hat{A}_m$ may be defined as:

$$\psi_{m,k}(\hat{A}_m | A_m, f_{k,n}) = \sum_{(x,y) \in \hat{A}_m} [G_{(x,y)}(\hat{f}_{k,n}) - G_{(x,y)}(f_{k,n})] \quad (4)$$

where (x, y) are the pixels of the manipulated image $\hat{f}_{k,n}$ and the sum of the salience distribution over the whole frame is equal to 1. The attention gain $\psi_{m,k}(\hat{A}_m|A_m,f_{k,n})$ has range from −1 to 1.

The VAG of shot $S_k$ with placed advertisement $A_m$ may then be defined as the sum of all the VAG of the frames in shot k.

$$\Psi_{m,k} = \begin{cases} \sum_{n=1}^{N_k} \psi_{m,k}(\hat{A}_m \mid A_m, f_{k,n}) : & m = (1, \ldots, M) \\ 0 : & m = 0 \end{cases} \quad (5)$$

The salience logic controls the salience distribution change between the original image/video to the manipulated ones. From the view point of original video, this can be seen as Salience Change Distortion (SCD), which may be restrained. This change may be defined based on frames.

Specifically, in certain embodiments, the SCD of inserting $A_m$ into $f_{k,n}$ can be estimated by function $\lambda(\bullet)$, which can be measured by the salience distribution change between manipulated frame $\hat{f}_{k,n}$ and original frame $f_{k,n}$. $G(\bullet)$ is a GBVS computational salience model as the same definition in eq. (5).

Certain embodiments may use Earth Mover's Distance (EMD) as a measure of the distance between these two salience distributions over these corresponding frames. The SCD may be estimated as $$\lambda(A_m,f_{k,n})=D[G(\hat{f}_{k,n}),G(f_{k,n})] \quad (6)$$

where the definition of EMD function $D(\bullet)$ is:

$$D(P, Q) = \left(\min_{\{p_{ij}\}} \sum_{i,j} p_{ij} d_{ij}\right) + \left|\sum_i P_i - \sum_j Q_j\right| \max_{i,j} d_{ij} \quad (7)$$

s.t.

$$\begin{cases} f_{ij} \geq 0, \sum_j f_{i,j} \leq P_i, \sum_i f_{ij} \leq Q_j, \\ \sum_{i,j} p_{ij} = \min\left(\sum_i P_i, \sum_j Q_j\right) \end{cases}$$

where P and Q are two distribution maps, each $f_1$ represents the distribution amount transported from i th supply in P to the j th demand in Q. $d_{ij}$ is the "ground distance" between bin i and bin j in the distributions. Higher value of EMD means more cost of tuning one distribution to another, also means larger distance between these two distributions, and larger salience change distortion.

The salience change constraint may be set as:

$$\lambda(A_m,f_{k,n}) \leq Th_1 \quad (8)$$

where $Th_1$ is the distortion threshold which can be learned by experiences.

After obtaining the VAG and SCD, the desired alignment between white-space candidates and advertisement elements may be generated by maximizing the VAG and restricting the SCD at the same time (S802).

The maximization of advertisement VAG helps to obtain the effectiveness of this advertising, while the minimization of SCD helps to keep the salient objects in the original frame being of high salient as much as possible in the manipulated frame, which helps to satisfy the viewers' view experience when watching the image/video.

Different alignment between advertisements and scenes may produce different degrees of SCD, and also the color, texture, orientation features of the advertisement elements have gain variant VAG in the selected scenes, which makes the global system optimization on alignments and placement settings possible.

From the definitions of VAG and SCD in eq. (5) and eq. (8), these two measurements are potentially conflict with each other under same insertion settings. Since to obtain large VAG of inserted advertisement, the salience change from the original salience distribution may increase. However, different selection of $A_m$ and different inserting settings of $T_l$, $P_p$ and $P_s$ can produce different VAG and SCD accordingly. And the threshold $Th_1$ constrains the acceptable advertisement selection and insertion settings. These make the global optimization over the video reasonable and necessary.

This optimization procedure focuses on solving how to align the advertisements with the shots and also how to select the placement settings. The alignment and placement of advertisements have to meet the SCD constraint, and at the same time to maximize the overall VAG of the manipulated video. Thus this is an optimization problem over the whole video. In certain embodiments, this optimization problem with constraints may be solved as the Rate-Distortion optimization.

Specifically, the summed VAG of M advertisements in the shots from 1 to K are denoted as $\Psi(s_1, s_2, \ldots, s_K)$, combine with the equation Eq. 5 and Eq. 4, $$\begin{aligned}
\Psi(s_1, s_2, \ldots, s_K) &= \sum_{k=1, m \in \{0, \ldots, M\}}^{k=K} \Psi_{m,k} \\
&= \sum_{k=1, m \in \{0, \ldots, M\}}^{k=K} \sum_{n=1}^{N_k} \psi_{m,k}(\hat{A}_m \mid A_m, f_{k,n}) \\
&= \sum_{k=1, m \in \{0, \ldots, M\}}^{k=K} \sum_{n=1}^{N_k} \left\{ \sum_{(x,y) \in \hat{A}_m} [G_{(x,y)}(\hat{f}_{k,n}) - G_{(x,y)}(f_{k,n})] \right\} \\
&= \sum_{k=1, m \in \{0, \ldots, M\}}^{k=K-1} \sum_{n=1}^{N_k} \left\{ \sum_{(x,y) \in \hat{A}_m} [G_{(x,y)}(\hat{f}_{k,n}) - G_{(x,y)}(f_{k,n})] \right\} + \\
&\quad \sum_{n=1}^{N_K} \left\{ \sum_{(x,y) \in \hat{A}_m} [G_{(x,y)}(\hat{f}_{K,n}) - G_{(x,y)}(f_{K,n})] \right\} \\
&= \Psi(s_1, s_2, \ldots, s_{K-1}) + \Psi_{m,K} \\
&= \Psi(s_1, s_2, \ldots, s_{K-1}) + w(K - 1, K)
\end{aligned} \quad (9)$$

where m=0 means no advertisement is inserted in the corresponding shot. From the definition of $W(s_1, s_2, \ldots, s_k)$, the VAG difference of shots from 1 to k−1, $\Psi(s_1, s_2, \ldots, s_{k-1})$, to shots from 1 to k, $\Psi(s_1, s_2, \ldots, s_K, s_k)$ only dependents on the last shot $S_k$. This difference is denoted as w(k−1,k).

The optimization is to maximize the total VAG of a video with K shots $\{S_k\}_{k=1}^K$ and M advertisements $\{A_m\}_{m=1}^M$, under the constraint of the SCD. Thus the objective function becomes:

$$\max \Psi(s_1, s_2, \ldots, s_K) \qquad (10)$$

s.t.

$$\max_{n=(1,\ldots,N_k)} \{\lambda(A_m, f_{k,n})\} \le Th_1, \text{ for shot}\{S_k\}_{k=1}^K$$

Specifically, in certain embodiments, this optimization problem may be further formalized as the shortest-path problem in a weighted Directed Acyclic Graph (DAG) (S80201). The global optimal solution of advertisement elements $\{A_m\}_{m=1}^M$ and shots $\{S_k\}_{k=1}^K$ is to obtained by the shortest path in a graph G. The parameters may include: m and k as the indices of the advertisement element and the shot in an alignment; $T_l$ as the 3D surface in $f_{k,n}$ where to put $A_m$ on; $P_p$ as the 3D position on the surface with $T_l$; $P_s$ as the scale of $A_m$, which determines the final size of $A_m$ on $\hat{f}_{k,n}$; and $\delta_{mk}$: the Gaussian filter variance under the quality constraint (3).

Therefore, certain embodiments may formalize the optimal placement of advertisements as a shortest-path problem in a weighted DAG G=(V, E), where V is the sets of graph vertices and E is the sets of edges connecting the vertices.

With formalized parameters in the graph, the node space, the state space and the weights of edges in the weighted graph may be modeled (S80202).

Each shot maybe modeled as a node rather than model all the frames in the shot as multiple nodes, since the alignment and placement setting can maintain the same in all frames of such shot. For the multiple alignment and setting options, the shot node is duplicated as a group of nodes.

Taking into consideration of multiple advertisement alignments, the DAG shortest path algorithm can be extended in to a (M+1)-D space, which means the states in the DAG state space may be represented by (M+1)-tuple elements instead of 1-tuple elements.

Figure 9:
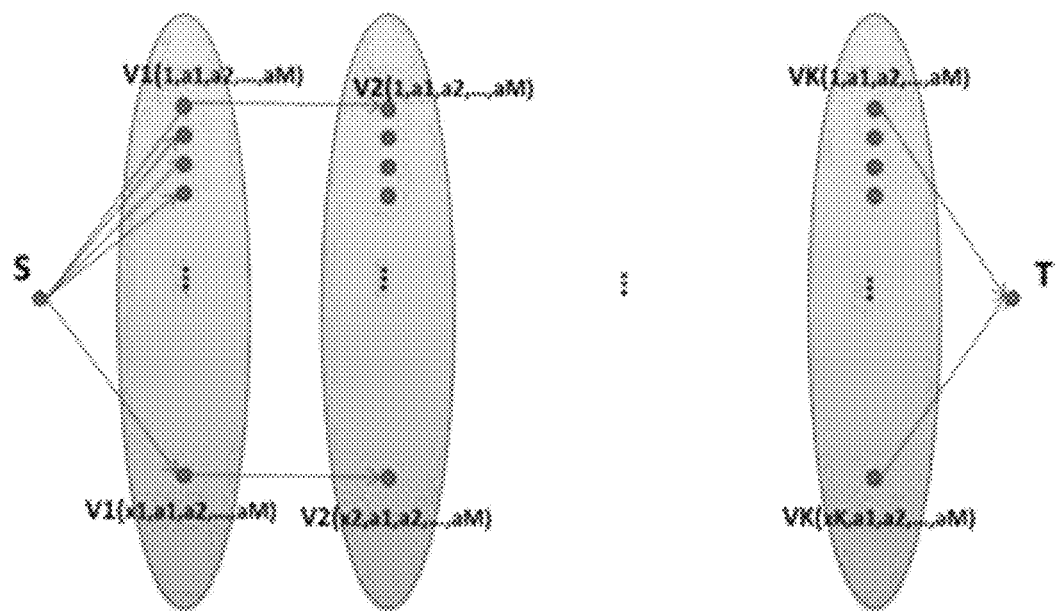
FIG. 9 illustrates an exemplary direct acyclic graph build for shots consistent with present disclosure.

Specifically, FIG. 9 illustrates a directed acyclic graph buid for shots $\{S_k\}_{k=1}^K$. As showed in FIG. 9, for shot $S_k$ there can be a group of nodes $\{v_k(x, a_{k,1}, \ldots, a_{k,M})\}_{x=1}^{x_k}$, which represent $x_k$ different insertion settings. The alignment and insertion setting include the selection of $A_m$, the position $P_p$ and surface $T_l$, the scale $P_s$, and the Gaussian filter variance $\delta_{m,k}$. The first dimension x represents x th insertion setting of combination of $P_p$, $T_l$, $P_s$ and $\delta_{m,k}$, while in the rest M dimensions, $a_{k,m}$ with m=(1, ..., M) represents the number of appearances of m th advertisement $A_m$ up to the shot $S_k$. Without loss of generality, the maximal appearances of advertisement $A_m$ is denoted as $F_m$, which can be set by users, thus $a_m \in [0, F_m]$.

For K shots, there are K groups of total $\Sigma_{i=1}^K x_k$ nodes. Each node in group of shot k is fully connected with nodes in the group of shot (k+1). All the nodes in group of the 1st shot are connected with source node S, and the nodes of K th shot are connected with sink node T.

Returning to FIG. 8, in order to be able to use dynamic programming for obtaining the optimal solution of problem eq. (10), a state space is defined, which is a subset of the union of all nodes space with elements $v_k(\bullet, a_{k,1}, \ldots, a_{k,M})$ satisfying $$\begin{cases} \sum_{m=1}^M a_{k,m} \le k \\ a_{k,m} \le F_m, \text{ for } m = (1, \ldots, M) \end{cases} \qquad (11)$$

Since no more than one advertisement can be inserted into frames of one shot, the total number of advertisement appearance is no larger than the number of shots and also no larger than its frequency $F_m$ set by users. Furthermost, the appearances of $A_m$ in shot $S_{k+1}$ is either equal to or 1 larger than the appearances in shot $S_k$. Thus certain embodiments may only connect the notes in group of shot $S_k$ with notes in shot $S_{k+1}$ with no more than one advertisement appearance increase.

Figure 10:
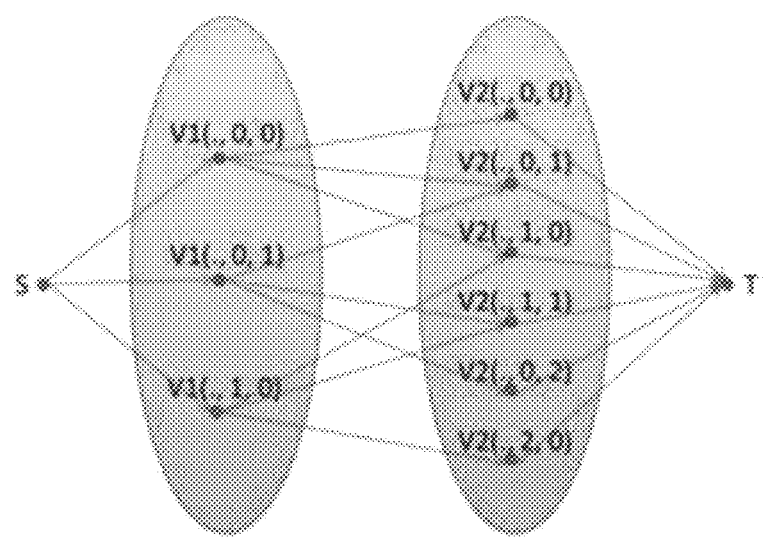
FIG. 10 illustrates an exemplary state space and edge connections consistent with present disclosure.

For example, FIG. 10 shows the state space for 2 shots with 2 advertisement choices example. In shot $S_1$, there are three states: $V_1(\bullet, 0, 0)$ means no advertisement is inserted, $V_1(\bullet, 1, 0)$ means advertisement $A_1$ is inserted and $V_1(\bullet, 0, 1)$ means advertisement $A_2$ is inserted. Then in shot $S_2$, each state can only have one dimension increased by 1, while other dimensions keep the same, plus the scenario of none advertisement is selected, the state have no increase. Following this rule the states in shot $S_2$ have 6 possible values derived from $S_1$. The derivation is denoted as edge connections between those states, as shown in FIG. 10.

Returning to FIG. 8, the edge which connecting two nodes from neighboring shots indicates the selected advertisement for the posterior shot. A weight for each edge is assigned to measure the VAG of the selected advertisement for the corresponding shot. The weight of the edge $w(v_k(\bullet, a_{k,1}, \ldots, a_{k,M}), v_{k\pm 1}(x, a_{k+1,1}, \ldots, a_{k+1,M}))$ connecting the notes of shot $S_k$ and shot $S_{k+1}$ is defined as the inverse visual attention gain of shot $S_{k+1}$ under salience change distortion constraint. This is a specified w(k, k+1) with advertisement selection and placement settings.

$$w(v_k(\bullet, a_{k,1}, \ldots, a_{k,M}), v_{k+1}(x, a_{k+1,1}, \ldots, a_{k+1,M})) = \qquad (13)$$

$$\begin{cases} -\Psi_{m,k+1}(x): & \lambda(A_m, f_{k+1}) \le Th1, \\ & \text{and } a_{k+1,i} = a_{k,i} \text{ for } i \ne m, \\ & \text{and } a_{k+1,m} = a_{k,m} + 1 \\ 0: & a_{k+1,i} = a_{k,i}, i = (1, \ldots, M) \\ \infty: & \text{otherwise} \end{cases}$$

where $\Psi_{m,k+1}(x)$ is the visual attention gain of $A_m$ inserted into frames of $S_{k+1}$ with the x th setting of parameters ($T_l$, $P_p$, $P_s$, $\delta(m,k+1)$). The source note S can be treated as $v_0(\bullet, 0, \ldots, 0)$, and the sink note T is fully connected with the notes of the last shot $S_K$ with weight 0. For the selected advertisement which may produce distortion larger than the threshold may be abandoned, thus an infinitely-great weight is assigned for its edge.

Following the graph modeling introduced above, maximizing the total VAG of a video is equalized to finding the shortest path from the source S to sink T (S80203). By defining the edge sets E in above fashion, the present embodiment achieves two goals simultaneously. First, the selected advertisement alignment meets the salience change constraints, and second and more important, the resulting graph is a weighted directed acyclic graph (DAG), whose shortest-path can be solved very efficiently by a DAG-shortest-path algorithm. The time complexity for DAG-shortest-path algorithm is $\Theta(|V|+|E|)$.

Returning to FIG. 6, an output video can be generated by inserting the advertisement elements into the white-space candidates according to the adjustment results (S609).

The disclosed method and system provides a media manipulation framework to place advertising elements into the image/video sequences, where the inserted advertisement elements can gain maximal salience while the rest of the original image/video maintains their original salience as much as possible. The framework may define shot as a group of frames with same scene background, estimate the shot scene structure, detect the "white space" as candidate places for advertisement placement. The placement of advertisement into 3D scene follows three logic and observations, which make the resulting manipulated video has reasonable and valid 3D structure and acceptable visual quality. One of the challenges for image/video manipulation is how to obtain the desired results and at the same time to keep the original main contents of the original source. This framework may measure the visual attention gain (VAG) of the advertisement and the salience change distortion (SCD) of the frame caused by the advertisement placement. The framework aims to maximizing the VAG of the advertisements, and at the same time restricting the SCD of the frames in video. The framework may utilize a global optimal solution approach that is based on a shortest path algorithm for a weighted directed acyclic graph, which can provide all the optimal alignments between the advertisements and frames and the optimal placing settings for each alignment.

By using the disclosed systems and methods, many advantageous applications can be implemented. The disclosed systems and methods may gain maximal visual attention for the inserted advertisements in the 3D scene with non-change to scene structure, minor change to video salience distribution and minor change of the video quality from input image/video to output image/video. Therefore, the disclosed salience-based media manipulation method makes the advertisements insertion more naturally, smoothly and effectively, and its performance is better than the existing traditional methods.

It is understood that the disclosed salience-based media manipulation system and method is not limited to advertisement insertion scenario. Other contents can also be applied in the disclosed system and method. Further, the inserted contents do not limited to an image. Any contents with graphical representation, such as texts, images, videos, may all be applied to the disclosed system and method.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for inserting contents into video presentations, comprising:
    establishing an advertisement-element pool containing a plurality of advertisement elements provided for insertion;
    obtaining an input video presenting at least one scenes and containing a plurality of original frames;
    performing shot grouping and primary scene analysis on the input video to acquire scenes with static background and scenes with limited camera motion;
    detecting white-space candidates in the acquired scenes for inserting at least one advertisement element;
    adjusting alignment between the white-space candidates and the at least one advertisement element to increase a salience gain of the advertisement elements and to limit salience change of the scenes without insertion; and
    generating an output video by inserting the advertisement elements into the white-space candidates according to the adjusted alignment between the white-space candidates and the advertisement elements;
    wherein adjusting alignment between the white-space candidates and the at least one advertisement element further includes:
        configuring alignment adjustment settings including one or more of white-space candidate selection, advertisement element selection, and visual qualities of the advertisement elements;
        measuring a visual attention gain (VAG) of the at least one advertisement element and a salience change distortion (SCD), the SCD being caused by salience distribution change between a manipulated frame and an original frame, the manipulated frame being the original frame inserted with an advertisement element; and
        obtaining a desired alignment by maximizing the VAG and limiting the SCD.

2. The method according to claim 1, wherein performing shot grouping and primary scene analysis further includes:
    grouping the original frames into several shots according to camera takes, wherein the camera takes have limited motion and location change; and
    filtering out moving objects and static regions with occlusion in scenes of the input video, resulting only static regions without occlusion in the scenes to be selected for advertisement elements insertion.

3. The method according to claim 1, detecting white-space candidates in the acquired scenes further comprising:
    analyzing a structure of the acquired scenes by estimating a geometry of each scene as a plurality of estimated planes; and
    identifying each white-space candidate as a region located in the estimated planes with smooth surface and homogeneous textures, each identified white-space candidate corresponding to an estimated plane, a location in the estimated plane, and a scale of the region.

4. The method according to claim 1, obtaining an advertisement-element pool further comprising:
    customizing contents and amount of the advertisement elements in advance according to one or more of an advertisement provider's requirements and a user's preferences; and
    obtaining an advertisement-element pool with the customized advertisement elements.

5. The method according to claim 3, after detecting white-space candidates in the acquired scenes for advertisement insertion, further comprising:
    generating a 2D advertisement image from an advertisement element with similar visual qualities as surroundings of a white-space candidate based on salience features of the visual qualities including one or more of blurriness, lighting effect and camera distortions; and
    transforming the 2D advertisement image according to the estimated plane, the location in the estimated plane and the scale of the region corresponded with the white-space candidate.

6. The method according to claim 1, wherein:
    provided that, n, m, and k are integers, $f_{k,n}$ is n th frame in k th shot, $\hat{f}_{k,n}$ is n th frame in k th shot after an advertisement element insertion, $\hat{A}_m$ is transformed m th advertisement element, function G(•) denotes an estimation of salience distribution of an image, the VAG of an advertisement element is calculated by applying a graph-based visual saliency model $$\psi_{m,k}(\hat{A}_m | A_m, f_{k,n}) = \sum_{(x,y) \in \hat{A}_m} [G_{(x,y)}(\hat{f}_{k,n}) - G_{(x,y)}(f_{k,n})]$$

wherein (x, y) are the pixels of the manipulated frame $\hat{f}_{k,n}$ and the sum of the salience distribution over the whole frame is equal to 1.

7. The method according to claim 6, wherein:
provided that, function λ(•) denotes the salience distribution change between a manipulated frame $\hat{f}_{k,n}$ and an original frame $f_{k,n}$, the salience change distortion is measured by $$\lambda(A_m, f_{k,n}) = D[G(\hat{f}_{k,n}), G(f_{k,n})]$$

wherein the definition of function D(•) is:

$$D(P, Q) = \left(\min_{\{p_{ij}\}} \sum_{i,j} p_{ij} d_{ij}\right) + \left|\sum_i P_i - \sum_j Q_j\right| \max_{i,j} d_{ij}$$

s.t.

$$\begin{cases} f_{ij} \geq 0, \sum_j f_{i,j} \leq P_i, \sum_i f_{ij} \leq Q_j, \\ \sum_{i,j} p_{ij} = \min\left(\sum_i P_i, \sum_j Q_j\right) \end{cases}$$

wherein P and Q are two distribution maps, each $f_{ij}$ represents the distribution amount transported from i th supply in P to the j th demand in Q·$d_{ij}$ is the ground distance between bin i and bin j in the distributions.

8. The method according to claim 1, wherein:
the desired alignment is obtained by finding a shortest path in a weighted directed acyclic graph, wherein each node in the weighted directed acyclic graph corresponds to one shot with one configuration of the alignment adjustment settings, each shot corresponds to a group of nodes with different configurations of the alignment adjustment settings, and each edge connecting two nodes from an anterior shot to a posterior shot indicating a selected advertisement element for the posterior shot.

9. A system for inserting contents into video presentations, comprising one or more processors, memory, one or more program modules stored in the memory and to be executed by the one or more processors, the one or more program modules comprising:
an advertisement processing module configured to obtain an advertisement-element pool containing a plurality of advertisement elements provided for insertion;
an video pre-processing module configured to perform shot grouping and primary scene analysis of an input video to acquire scenes with static background and scenes with limited camera motion, the input video presenting at least one scenes and containing a plurality of original frames;
a white-space candidate detection module configured to detect white-space candidates in the acquired scenes for inserting at least one advertisement element;
an alignment adjustment module configured to adjust alignment between the white-space candidates and the at least one advertisement element to increase a salience gain of the advertisement elements and to limit salience change of the scenes without insertion; and
an output module configured to generate an output video by inserting the advertisement elements into the white-space candidates according to the adjusted alignment between the white-space candidates and the advertisement elements;
wherein the alignment adjustment module is further configured to:
adjust alignment adjustment settings including one or more of white-space candidate selection, advertisement element selection, and visual qualities of the advertisement elements;
measure a visual attention gain (VAG) of the at least one advertisement element and a salience change distortion (SCD), the SCD being caused by salience distribution change between a manipulated frame and an original frame, the manipulated frame being the original frame inserted with an advertisement element; and
obtain a desired alignment by maximizing the VAG and limiting the SCD.

10. The system according to claim 9, wherein the video pre-processing module is further configured to:
group the original frames into several shots according to camera takes, wherein the camera takes have limited motion and location change; and
filter out moving objects and static regions with occlusion in scenes of the input video, resulting only static regions without occlusion in the scenes to be selected for advertisement elements insertion.

11. The system according to claim 9, wherein the white-space candidates detection module is further configured to:
analyze a structure of the acquired scenes by estimating a geometry of each scene as a plurality of estimated planes; and
identify each white-space candidates as a region located in the estimated planes with smooth surface and homogeneous textures, each identified white-space candidate corresponding to an estimated plane, a location in the estimated plane, and a scale of the region.

12. The system according to claim 9, wherein the advertisement processing module is further configured to:
customize contents and amount of the advertisement elements in advance according to one or more of an advertisement provider's requirements and a user's preferences; and
obtain an advertisement-element pool with the customized advertisement elements.

13. The system according to claim 11, wherein the advertisement processing module is further configured to:
generate a 2D advertisement image from an advertisement element with similar visual quality as surroundings of a white-space candidate based on salience features including one or more of blurriness, lighting effect and camera distortions; and
transform the 2D advertisement image according to the estimated plane, the location in the estimated plane and the scale of the region corresponded with the white-space candidate.

14. The system according to claim 9, wherein:
provided that, n, m, and k are integers, $f_{k,n}$ is n th frame in k th shot, $\hat{f}_{k,n}$ is n th frame in k th shot after an advertisement element insertion, $\hat{A}_m$ is transformed m th advertisement element, function G(•) denotes an estimation of salience distribution of an image, the VAG of an advertisement element is calculated by applying a graph-based visual saliency model $$\psi_{m,k}(\hat{A}_m | A_m, f_{k,n}) = \sum_{(x,y) \in \hat{A}_m} [G_{(x,y)}(\hat{f}_{k,n}) - G_{(x,y)}(f_{k,n})]$$

wherein (x, y) are the pixels of the manipulated frame $\hat{f}_{k,n}$ and the sum of the salience distribution over the whole frame is equal to 1.

15. The system according to claim 14, wherein:
provided that function $\lambda(\bullet)$ denotes the salience distribution change between a manipulated frame $\hat{f}_{k,n}$ and an original frame $f_{k,n}$, the salience change distortion is measured by $$\lambda(A_m, f_{k,n}) = D[G(\hat{f}_{k,n}), G(f_{k,n})]$$

wherein the definition of function $D(\bullet)$ is:

$$D(P, Q) = \left( \min_{\{p_{ij}\}} \sum_{i,j} p_{ij} d_{ij} \right) + \left| \sum_i P_i - \sum_j Q_j \right| \max_{i,j} d_{ij}$$

s.t.

$$\begin{cases} f_{ij} \geq 0, \sum_j f_{i,j} \leq P_i, \sum_i f_{ij} \leq Q_j, \\ \sum_{i,j} p_{ij} = \min\left( \sum_i P_i, \sum_j Q_j \right) \end{cases}$$

wherein P and Q are two distribution maps, each $f_{ij}$ represents the distribution amount transported from i th supply in P to the j th demand in Q·$d_{ij}$ is the ground distance between bin i and bin j in the distributions.

16. The system according to claim 9, wherein:
the desired alignment is obtained by finding a shortest path in a weighted directed acyclic graph, wherein each node in the weighted directed acyclic graph corresponds to one shot with one configuration of the alignment adjustment settings, each shot corresponds to a group of nodes with different configurations of the alignment adjustment settings, and each edge connecting two nodes from an anterior shot to a posterior shot indicates a selected advertisement element for the posterior shot.

* * * * *